US012780725B2

(12) United States Patent
Fujita

(10) Patent No.: US 12,780,725 B2
(45) Date of Patent: Nov. 3, 2026

(54) CHAMFERED TRANSPARENT MEMBER, AND WINDOW COMPONENT FOR OPTICAL ELEMENT

(71) Applicant: NIPPON ELECTRIC GLASS CO., LTD., Otsu (JP)

(72) Inventor: Hiroki Fujita, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 84 days.

(21) Appl. No.: 18/704,149

(22) PCT Filed: Nov. 18, 2022

(86) PCT No.: PCT/JP2022/042889
§ 371 (c)(1),
(2) Date: Apr. 24, 2024

(87) PCT Pub. No.: WO2023/095734
PCT Pub. Date: Jun. 1, 2023

(65) Prior Publication Data
US 2024/0409457 A1 Dec. 12, 2024

(30) Foreign Application Priority Data
Nov. 25, 2021 (JP) ................................ 2021-191386

(51) Int. Cl.
*C03C 23/00* (2006.01)
*C03C 15/00* (2006.01)
*C03C 17/06* (2006.01)

(52) U.S. Cl.
CPC .......... *C03C 23/0025* (2013.01); *C03C 15/00* (2013.01); *C03C 17/06* (2013.01); *C03C 2217/25* (2013.01); *C03C 2217/73* (2013.01)

(58) Field of Classification Search
CPC ...... C03C 17/36; C03C 17/3649; B23K 26/53
See application file for complete search history.

(56) References Cited

U.S. PATENT DOCUMENTS 5,853,835 A * 12/1998 Leniton .................. B44F 1/066 52/311.2
11,077,645 B2 * 8/2021 Inoue ............... B32B 17/10036
(Continued)

FOREIGN PATENT DOCUMENTS

CN 109814181 A 5/2019
CN 110520972 A 11/2019
(Continued)

OTHER PUBLICATIONS

PE2E translation JP 2020142964 (Year: 2019).*
(Continued)

*Primary Examiner* — Ida M Soward
(74) *Attorney, Agent, or Firm* — Keating & Bennett, LLP

(57) ABSTRACT

A method for manufacturing a transparent member includes forming a plurality of through holes in a transparent substrate and separating the transparent substrate along an imaginary line connecting centers of the plurality of through holes. The transparent member includes a first principal surface and a second principal surface opposed to each other and a lateral surface connecting the first principal surface and the second principal surface. The transparent member has a plurality of corners and a plurality of sides in plan view, wherein a portion of the lateral surface located at least one of the plurality of corners is an etched surface, and a portion of the lateral surface located at least one of the plurality of sides is a diced surface. At least one of the plurality of corners has a chamfered shape.

7 Claims, 12 Drawing Sheets

(56) References Cited

U.S. PATENT DOCUMENTS

| | | | | |
|---|---|---|---|---|
| 2001/0001686 | A1 * | 5/2001 | Kishida | B32B 17/10917<br>156/154 |
| 2009/0098712 | A1 * | 4/2009 | Taguchi | H10P 50/693<br>257/E21.214 |
| 2009/0304976 | A1 * | 12/2009 | Matsumoto | C03C 19/00<br>428/64.2 |
| 2010/0147813 | A1 * | 6/2010 | Lei | C03B 33/0222<br>219/121.72 |
| 2011/0129648 | A1 * | 6/2011 | Gu | C03C 21/002<br>65/106 |
| 2013/0192305 | A1 * | 8/2013 | Black | C03B 33/0222<br>65/30.14 |
| 2014/0170388 | A1 * | 6/2014 | Kashima | B24B 9/10<br>428/157 |
| 2016/0282527 | A1 * | 9/2016 | Saito | B23K 26/402 |
| 2016/0354996 | A1 * | 12/2016 | Alder | C03C 3/091 |
| 2018/0145231 | A1 | 5/2018 | Fujii et al. | |
| 2019/0193205 | A1 | 6/2019 | Sekiya et al. | |
| 2019/0276356 | A1 * | 9/2019 | Abbott | C03C 19/00 |
| 2021/0078899 | A1 * | 3/2021 | Da | C03C 3/091 |
| 2021/0125868 | A1 | 4/2021 | Taguchi et al. | |
| 2021/0206692 | A1 * | 7/2021 | Lee | C03C 21/003 |
| 2021/0276133 | A1 | 9/2021 | Sohr et al. | |
| 2022/0169555 | A1 | 6/2022 | Suzuki | |

FOREIGN PATENT DOCUMENTS

| | | | | |
|---|---|---|---|---|
| JP | 11-139840 | A | | 5/1999 |
| JP | 2002-243958 | A | | 8/2002 |
| JP | 2005-332947 | A | | 12/2005 |
| JP | 2007005520 | A | | 1/2007 |
| JP | 2017-213641 | A | | 12/2017 |
| JP | 2018-182163 | A | | 11/2018 |
| JP | 2019116395 | A | | 7/2019 |
| JP | 2020-066554 | A | | 4/2020 |
| JP | 2020142964 | A | * | 9/2020 |
| JP | 2021-138610 | A | | 9/2021 |
| WO | 2013/099893 | A1 | | 7/2013 |
| WO | 2020184175 | A1 | | 9/2020 |

OTHER PUBLICATIONS

Official Communication issued in International Patent Application No. PCT/JP2022/042889, mailed on Jan. 31, 2023.

Official Communication issued in corresponding Chinese Patent Application No. 202280070242.0, mailed on Jul. 16, 2026, 7 pages.

Official Communication issued in corresponding Japanese Patent Application No. 2023-563664, mailed on Jul. 14, 2026, 6 pages.

* cited by examiner

[FIG. 1]
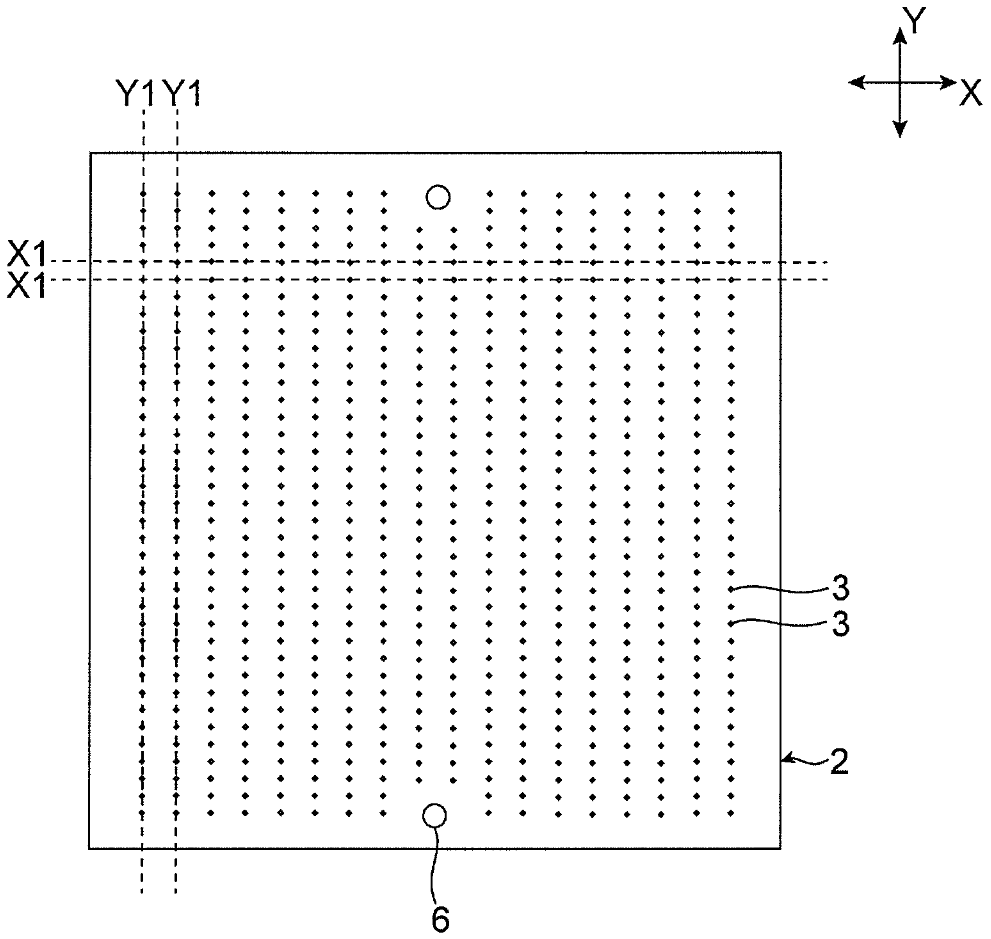

[FIG. 2]
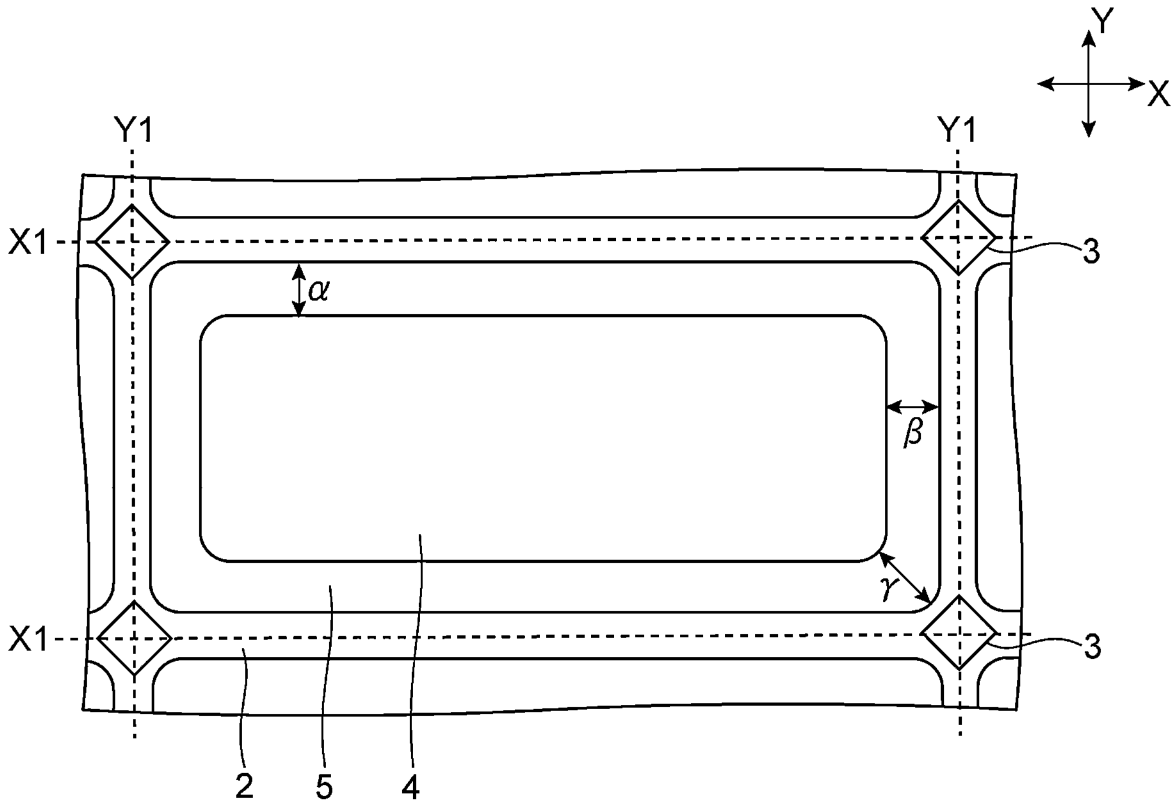

[FIG. 3]
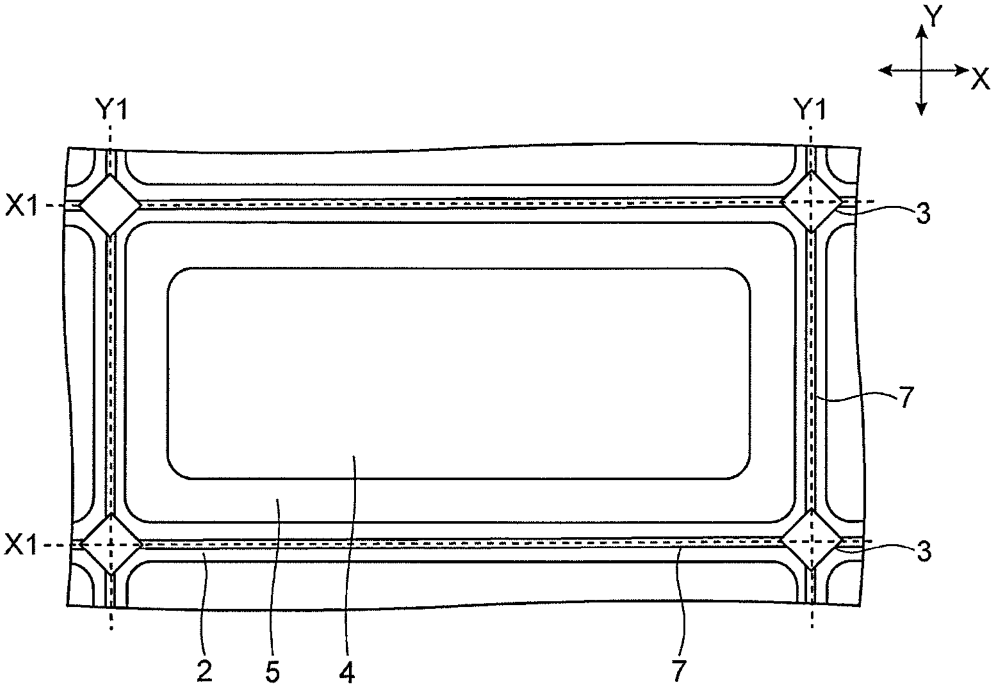

[FIG. 4]
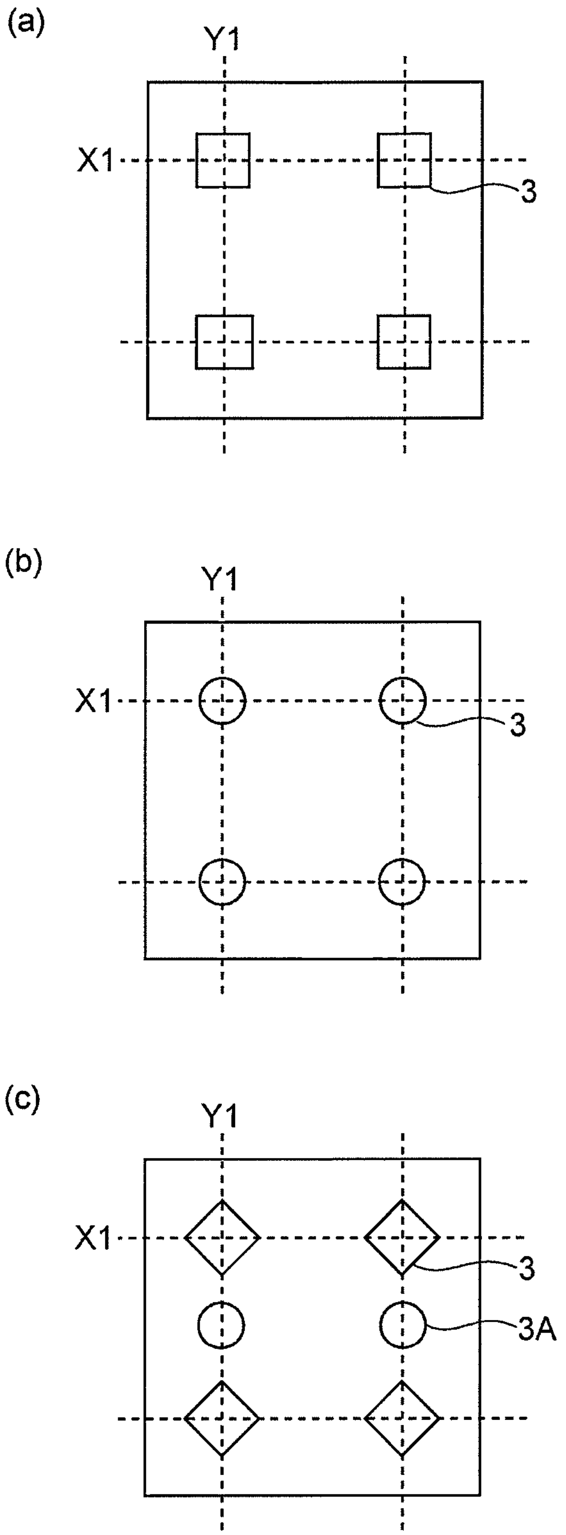

[FIG. 5]
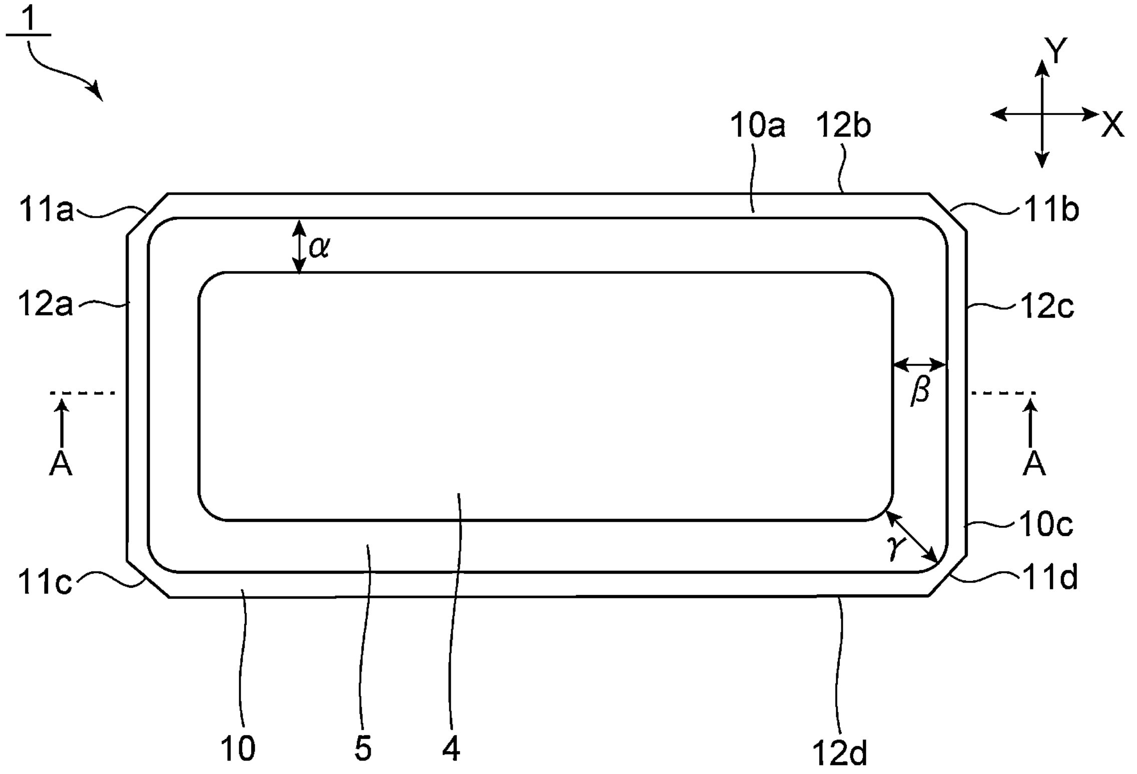
[FIG. 6]
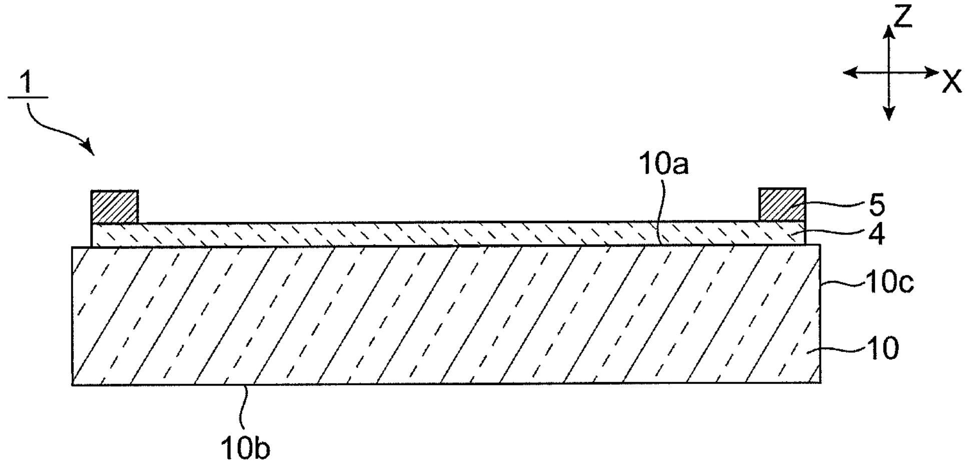

[FIG. 7]
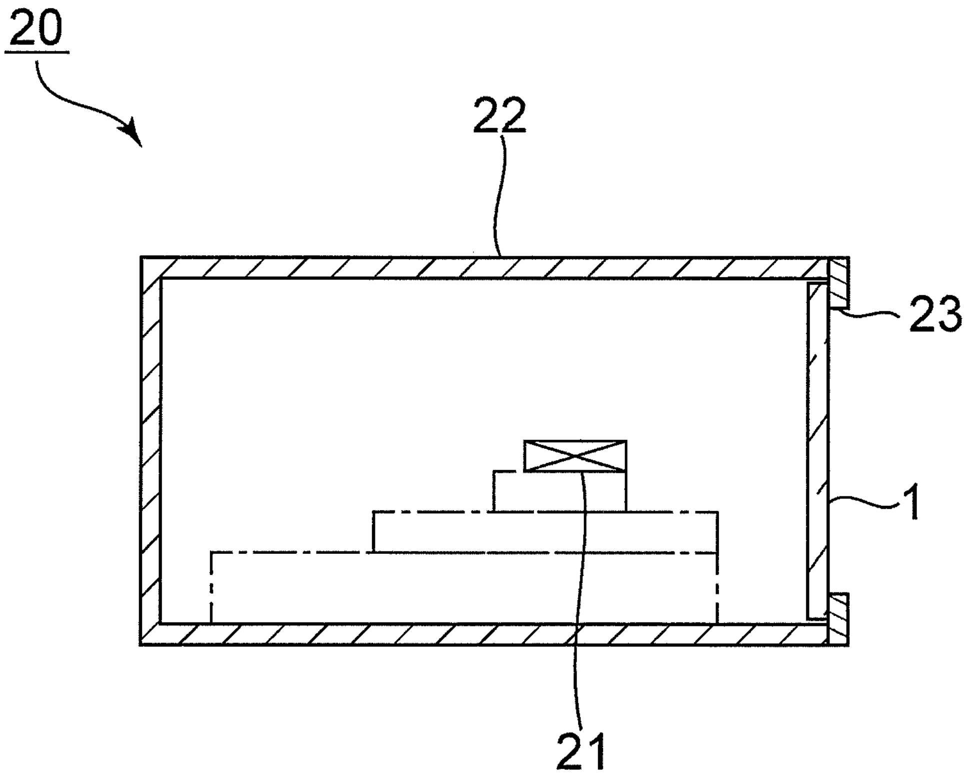

[FIG. 8]
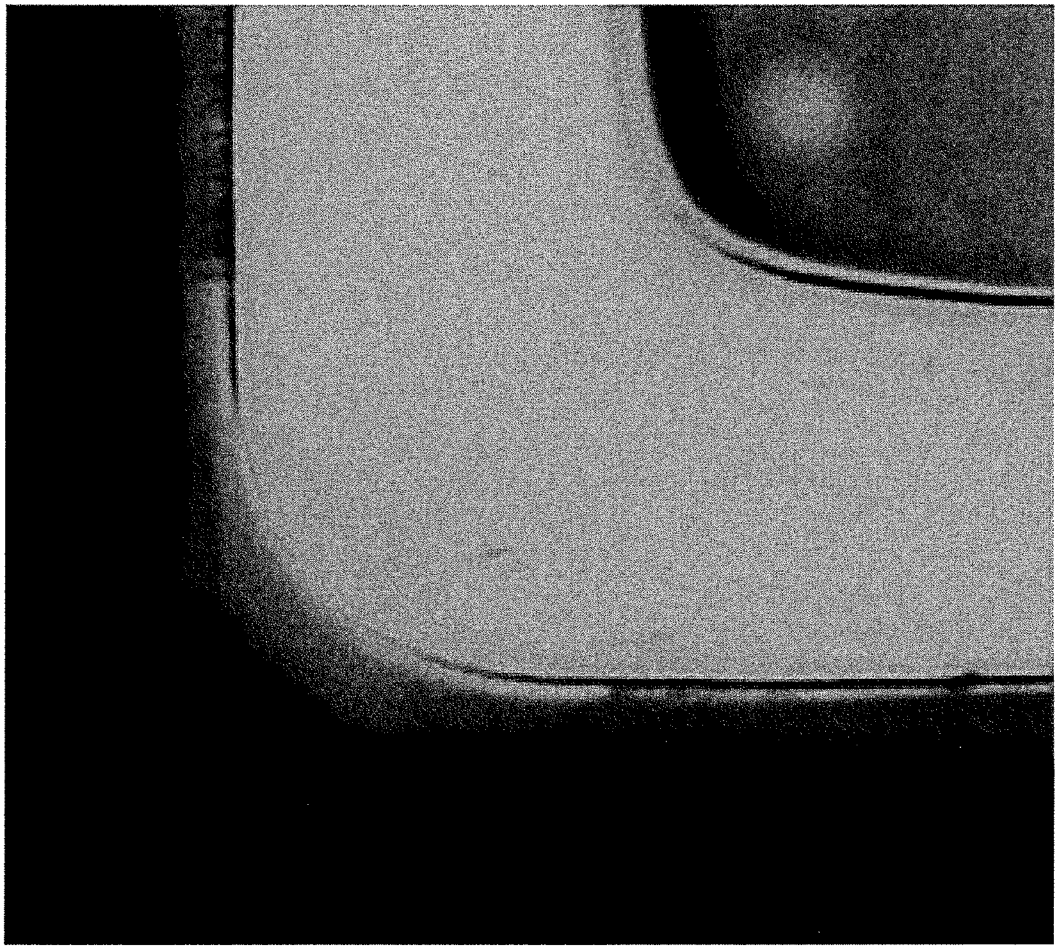

[FIG. 9]
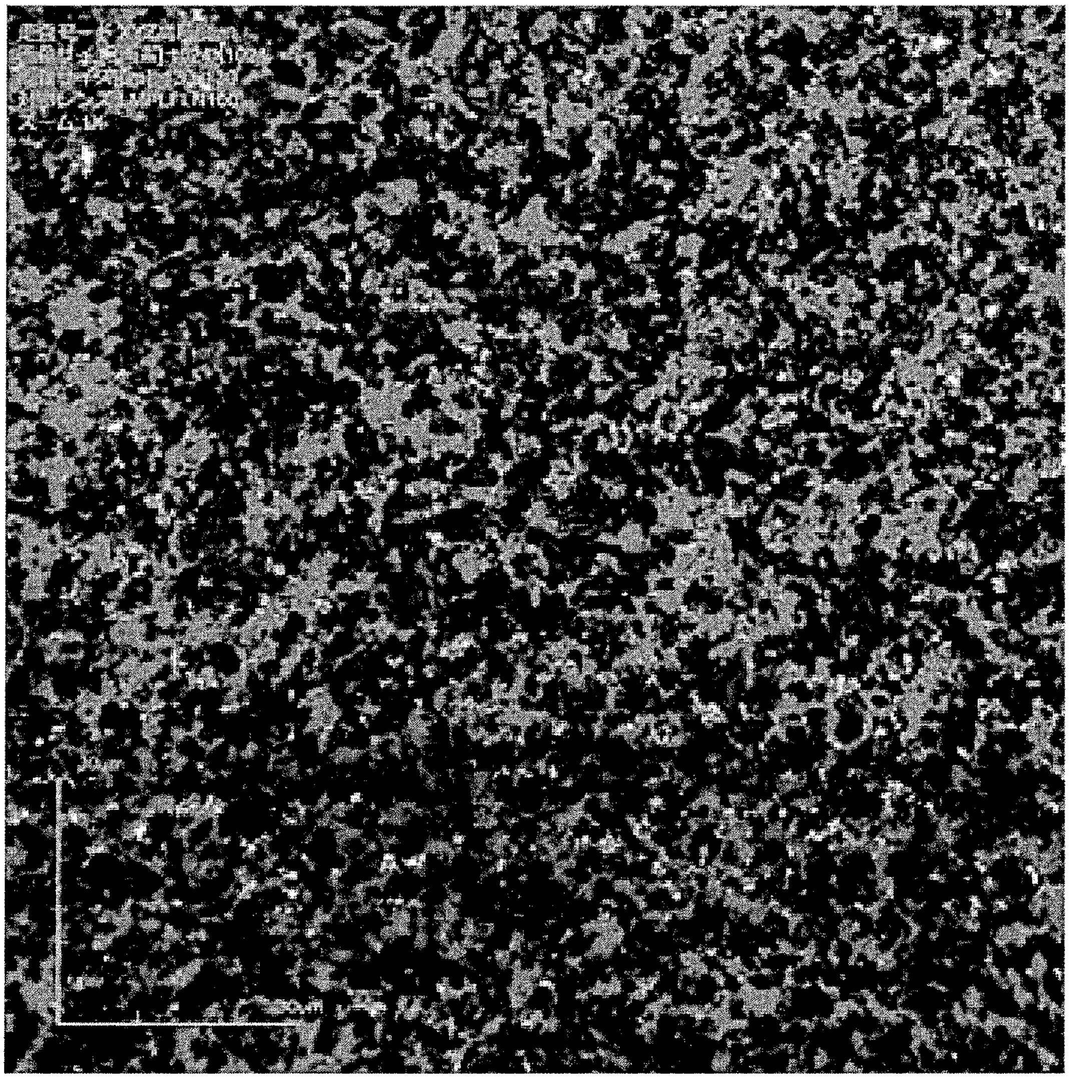

[FIG. 10]
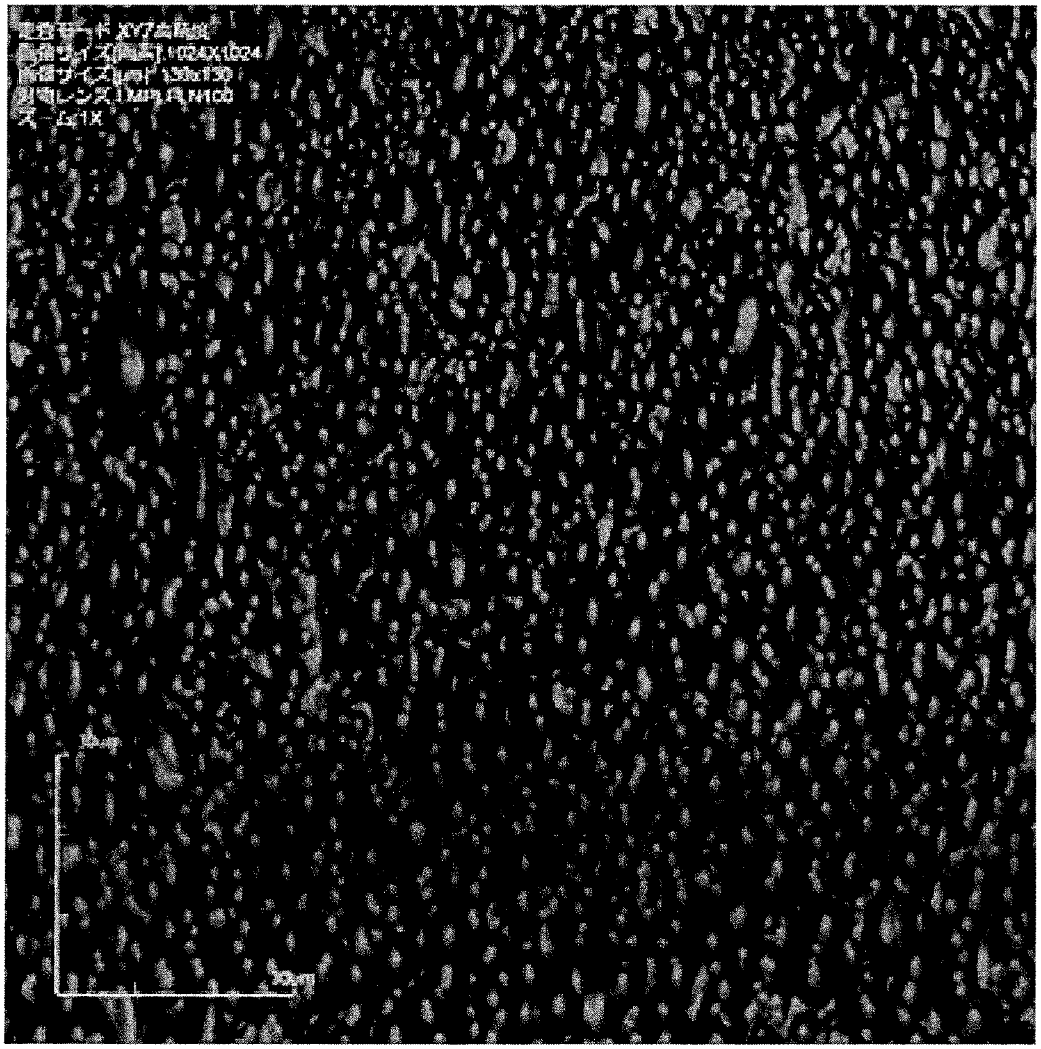

[FIG. 11]
(a)
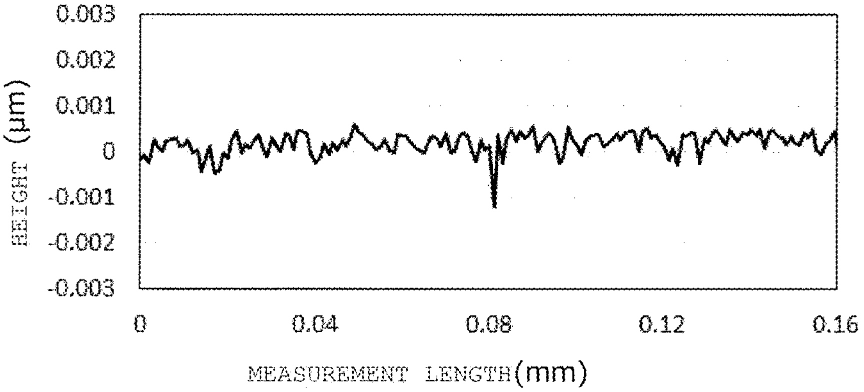
(b)
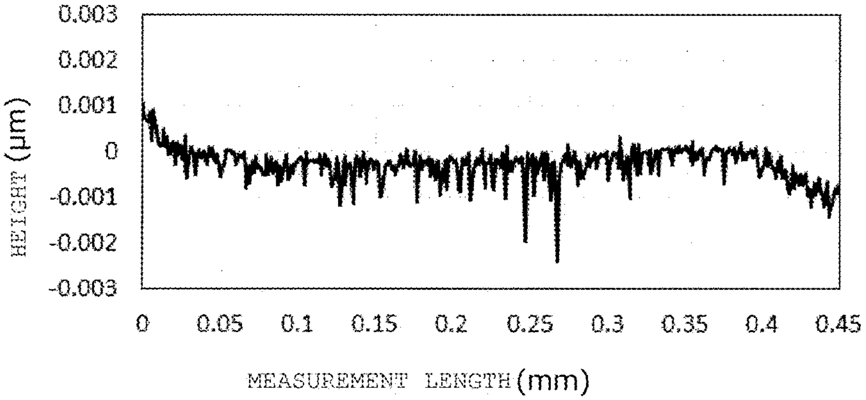

[FIG. 12]
(a)
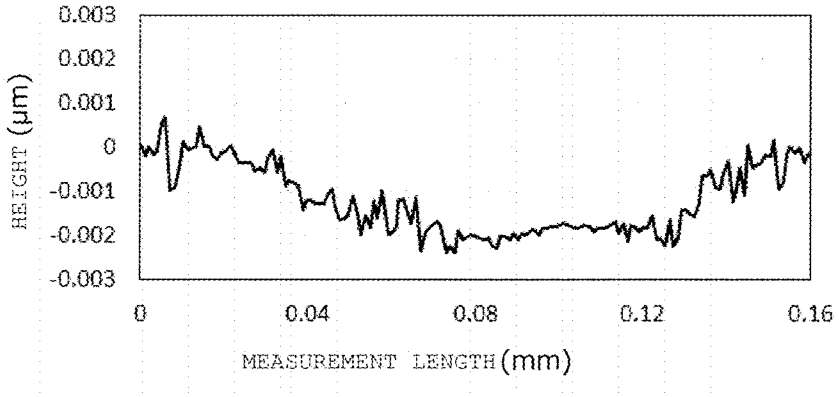
(b)
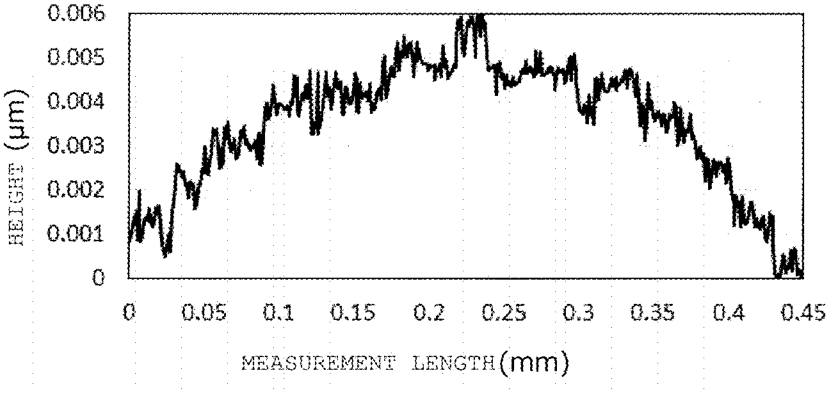

[FIG. 13]
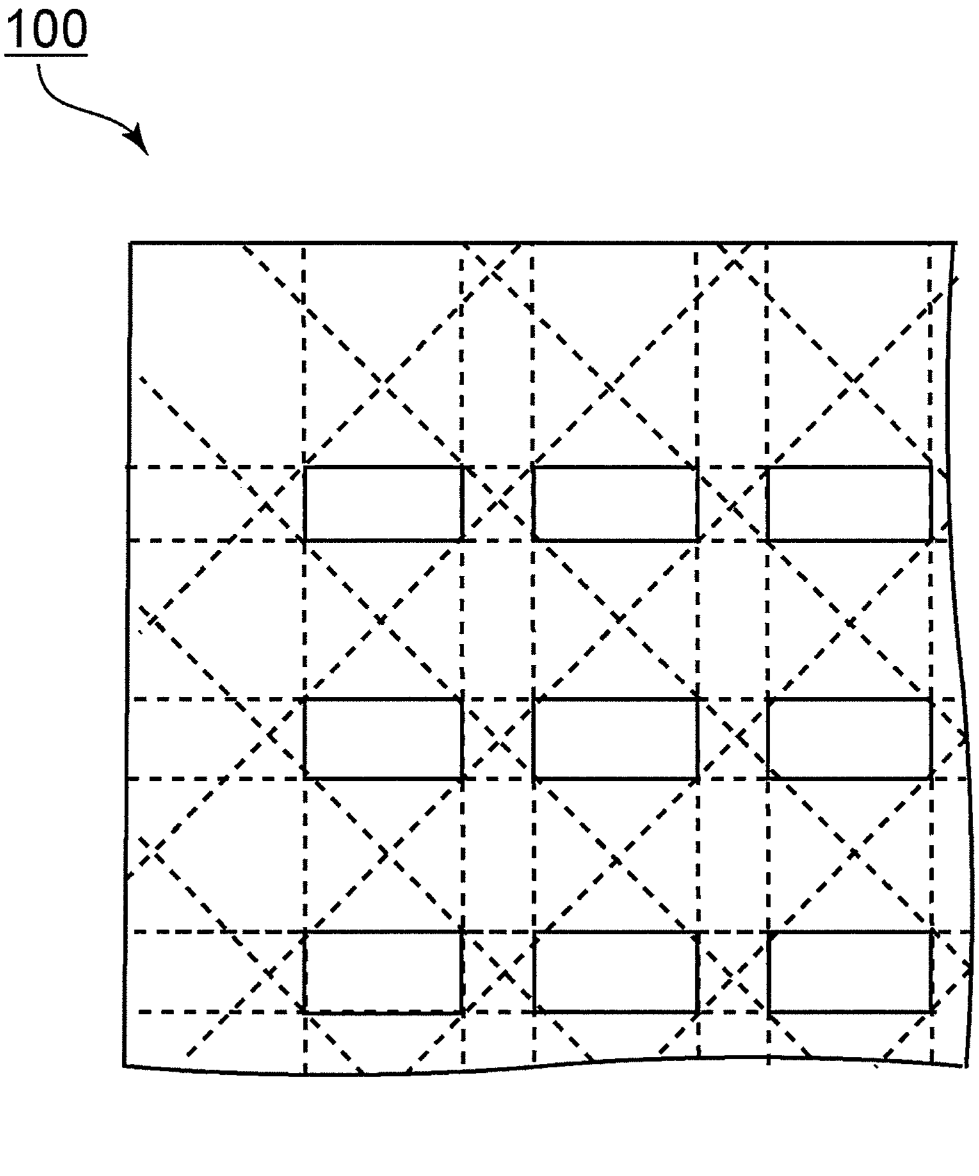

CHAMFERED TRANSPARENT MEMBER, AND WINDOW COMPONENT FOR OPTICAL ELEMENT

TECHNICAL FIELD

The present invention relates to methods for manufacturing transparent members, transparent members, and window components for optical elements as which the transparent members are used.

BACKGROUND ART

An optical element, such as an optical semiconductor, for use in optical communication, an optical system, and so on is normally contained in an enclosure, such as a package. A wall of the enclosure is provided with a light transmitting hole through which the optical element performs optical communication with the outside. For the purpose of ensuring the airtightness of the enclosure and other purposes, the light transmitting hole is covered with a window component for the optical element.

For example, Patent Literature 1 below discloses a window component that is for use in an optical element and includes a glass window having an outline shape of a regular octagon or any other regular polygon having a larger number of sides. Patent Literature 1 describes that when a glass window of a window component for an optical element has a regular octagonal shape, multiple window components for optical elements can be produced simply by cutting, as shown in FIG. 5 of the literature, a glass substrate 14 at a plurality of points thereof and four times in each of the directions of arrows a to d.

CITATION LIST

Patent Literature

[PTL 1]
JP-A-2005-332947

SUMMARY OF INVENTION

Technical Problem

However, in accordance with the method of cutting the glass substrate to cut out it into regular octagonal or other polygonal glass windows as in FIG. 5 of Patent Literature 1, portions of the glass substrate other than the cutout glass windows cannot be used anymore for this purpose and, therefore, there arises a problem of difficulty in increasing the number of glass windows obtained from the glass substrate.

An object of the present invention is to provide a method for manufacturing a transparent member that can increase the number of transparent members obtained from a transparent substrate as a base material, a transparent member, and a window component for an optical element as which the transparent member is used.

Solution to Problem

A description will be given below of aspects of a method for manufacturing a transparent member that can solve the above problem, a transparent member, and a window component for an optical element as which the transparent member is used.

A method for manufacturing a transparent member of Aspect 1 in the present invention includes: a first step of forming a plurality of through holes in a transparent substrate; and a second step of separating the transparent substrate along an imaginary line connecting centers of the plurality of through holes, thus obtaining a transparent member.

A method for manufacturing a transparent member of Aspect 2 is the method according to Aspect 1, wherein a planar shape of the through holes may be a polygon. In this case, the transparent substrate is preferably separated along an imaginary line connecting vertices of the polygons of the plurality of through holes.

A method for manufacturing a transparent member of Aspect 3 is the method according to Aspect 1 or 2, wherein the first step preferably includes the steps of: irradiating points on the transparent substrate where the through holes are to be formed with laser light to provide modified portions; and etching the transparent substrate at the points where the through holes are to be formed and the modified portions are provided, thus forming the through holes.

A method for manufacturing a transparent member of Aspect 4 is the method according to any one of Aspects 1 to 3, wherein the separating of the transparent substrate in the second step is preferably performed by dicing.

A method for manufacturing a transparent member of Aspect 5 is the method according to any one of Aspects 1 to 4, wherein after the first step and before the second step, a film is preferably formed on at least one of principal surfaces located on both sides of the transparent substrate.

A method for manufacturing a transparent member of Aspect 6 is the method according to Aspect 5, wherein the film is preferably a metalized film provided in the shape of a frame to meet the transparent member after the second step, and the metalized film is preferably formed to have a width $\gamma$ of corners of the frame equal to or larger than a width C of sides of the frame.

A method for manufacturing a transparent member of Aspect 7 is the method according to any one of Aspects 1 to 6, wherein after the first step and before the second step, the transparent substrate is preferably etched along the imaginary line connecting the centers of the through holes to form a groove.

A transparent member of Aspect 8 in the present invention is a transparent member that has a first principal surface and a second principal surface opposed to each other and a lateral surface connecting the first principal surface and the second principal surface and has a plurality of corners and a plurality of sides in plan view, wherein a portion of the lateral surface located at least one of the plurality of corners is an etched surface and a portion of the lateral surface located at least one of the plurality of sides is a diced surface.

A transparent member of Aspect 9 is the transparent member according to Aspect 8, wherein a maximum profile valley depth Rv of the etched surface measured in conformity with JIS B 0601:2013 is preferably smaller than a maximum profile valley depth Rv of the diced surface measured in conformity with JIS B 0601:2013.

A transparent member of Aspect 10 is the transparent member according to Aspect 8 or 9, wherein a maximum profile valley depth Rv of the etched surface measured in conformity with JIS B 0601:2013 is preferably not less than 0.100 μm and not more than 1.100 μm.

A transparent member of Aspect 11 is the transparent member according to any one of Aspects 8 to 10, wherein at least one of the plurality of corners preferably has a chamfered shape.

A transparent member of Aspect 12 is the transparent member according to any one of Aspects 8 to 11, wherein at least one of the plurality of sides preferably has a light-chamfered shape.

A transparent member of Aspect 13 is the transparent member according to any one of Aspects 8 to 12, wherein a metalized film is preferably provided on at least one of the first principal surface and the second principal surface, and the metalized film preferably has a width $\gamma$ of the corners equal to or larger than a width $\alpha$ of the sides.

A transparent member of Aspect 14 is the transparent member according to any one of Aspects 8 to 13, wherein an antireflection film is preferably provided on at least one of the first principal surface and the second principal surface.

A window component for an optical element of Aspect 15 includes the transparent member according to any one of Aspects 8 to 14.

Advantageous Effects of Invention

The present invention enables provision of a method for manufacturing a transparent member that can increase the number of transparent members obtained from a transparent substrate as a base material, a transparent member, and a window component for an optical element as which the transparent member is used.

BRIEF DESCRIPTION OF DRAWINGS

FIG. 1 is a schematic plan view showing a transparent substrate for use in a method for manufacturing a transparent member according to one embodiment of the present invention.

FIG. 2 is a schematic plan view showing in magnification the transparent substrate of FIG. 1.

FIG. 3 is a schematic plan view showing a transparent substrate in a modification.

FIGS. 4(*a*) to 4(*c*) are schematic views showing the shapes of through holes in modifications.

FIG. 5 is a schematic plan view showing a transparent member according to one embodiment of the present invention.

FIG. 6 is a schematic cross-sectional view of a portion taken along the line A-A in FIG. 5.

FIG. 7 is a schematic cross-sectional illustration showing an example where the transparent member according to the one embodiment of the present invention is used as a window component for an optical element.

FIG. 8 is a laser micrograph of a transparent member obtained in an experimental example.

FIG. 9 is a laser micrograph of a lateral surface (diced surface) located at a side of the transparent member obtained in the experimental example.

FIG. 10 is a laser micrograph of a lateral surface (etched surface) located at a corner of the transparent member obtained in the experimental example.

FIG. 11(*a*) is a roughness curve of a lateral surface (diced surface) located at the side of the transparent member obtained in the experimental example as generated in a direction along the side (direction X) and FIG. 11(*b*) is a roughness curve thereof as generated in a direction of thickness (direction Z).

FIG. 12(*a*) is a roughness curve of a lateral surface (etched surface) located at the corner of the transparent member obtained in the experimental example as generated in the direction along the side (direction X) and FIG. 12 (*b*) is a roughness curve thereof as generated in the direction of thickness (direction Z).

FIG. 13 is a schematic plan view of a transparent substrate in a comparative example.

DESCRIPTION OF EMBODIMENTS

Hereinafter, a description will be given of preferred embodiments. However, the following embodiments are merely illustrative and the present invention is not limited to the following embodiments. Throughout the drawings, members having substantially the same functions may be referred to by the same reference characters.

[Manufacturing Method of Transparent Member]

In a method for manufacturing a transparent member according to the present invention, first, a plurality of through holes are formed in a transparent substrate (a first step). Next, the transparent substrate is separated along an imaginary line connecting the centers of the plurality of through holes. Thus, a transparent member according to the present invention can be obtained (a second step).

(First Step)

FIG. 1 is a schematic plan view showing a transparent substrate for use in a method for manufacturing a transparent member according to one embodiment of the present invention. FIG. 2 is a schematic plan view showing in magnification the transparent substrate of FIG. 1. As shown in FIGS. 1 and 2, in the first step, a plurality of through holes 3 are formed in a transparent substrate 2.

The transparent substrate 2 transmits at least part of light in a wavelength range of 450 nm to 700 nm. The term "transparent" herein means that the light transmittance in a visible wavelength range of 450 nm to 700 nm is 70% or more.

Examples of the material for the transparent substrate 2 that can be used include glasses, such as quartz glass, and sapphire. The shape of the transparent substrate 2 is an approximately rectangular plate-like shape in this embodiment, but is not particularly limited. The area of the transparent substrate 2 may be, for example, not less than 100 $mm^2$ and not more than 90,000 $mm^2$. The thickness of the transparent substrate 2 may be, for example, not less than 0.05 mm and not more than 2.00 mm.

In this embodiment, the plurality of through holes 3 are formed to be arranged at equal intervals along a direction X (lengthwise direction). Furthermore, the plurality of through holes 3 are formed to be arranged at equal intervals along a direction Y (widthwise direction) orthogonal to the direction X. The distance between the centers of adjacent through holes 3 in each of the direction X and direction Y may be, for example, not less than 0.50 mm and not more than 300 mm.

In this embodiment, the plurality of through holes 3 are formed so that the planar shape of each of them is an approximately diamond shape. The area of each of the through holes 3 (the area per through hole) in plan view is not particularly limited, but may be, for example, not less than 0.01 $mm^2$ and not more than 100 $mm^2$. The number of through holes 3 provided in the transparent substrate 2 is also not particularly limited, but may be, for example, not less than 6 and not more than 3,000.

In the present invention, the locations and shapes of the through holes 3 are not particularly limited and can be appropriately determined according to the shape of transparent members to be obtained by separating the transparent substrate into pieces. The through holes 3 may not necessarily be arranged at equal intervals, unlike this embodiment.

The method for forming the through holes 3 is not particularly limited, but the through holes 3 can be, for example, by etching points (to-be-passed-through points) on the transparent substrate 2 where the through holes 3 are to be formed. In this embodiment, the through holes 3 are formed by irradiating to-be-passed-through points on the transparent substrate 2 with laser light to provide modified portions in the inside of the transparent substrate 2 and then etching the transparent substrate 2 at the to-be-passed-through points where the modified portions are provided.

The irradiation with laser light can be performed with appropriate adjustment of the laser output by a known method in the art. An example of the laser light that can be used is pulsed laser. The wavelength of the pulsed laser is, for example, preferably not less than 400 nm, more preferably not less than 500 nm, particularly preferably not less than 700 nm, preferably not more than 1500 nm, and more preferably not more than 1000 nm. The upper limit of the wavelength of the pulsed laser is not particularly limited, but may be, for example, 2000 nm.

The etching can be performed by a known method in the art. The etching can be performed, for example, by bringing an etchant into contact with the points where the through holes 3 are to be formed. Examples of the etchant include a hydrofluoric acid aqueous solution, a nitric acid aqueous solution, a hydrochloric acid aqueous solution, a ferric chloride aqueous solution, an oxalic acid aqueous solution, and a mixed solution containing at least two of the above aqueous solutions. Alternatively, the etchant may be an alkaline detergent.

As shown in FIG. 2, in the manufacturing method according to this embodiment, an antireflection film 4 and a metalized film 5 are deposited on a principal surface of the transparent substrate 2. More specifically, a frame-shaped metalized film 5 is deposited on the antireflection film 4. Each of the antireflection film 4 and the metalized film 5 can be formed, for example, by depositing it by a sputtering method or a vapor deposition method through a metal mask or the like provided on a portion of the transparent substrate 2 other than a portion thereof where the film is to be formed. In depositing the film, as shown in FIG. 1, through holes 6 for use in positioning the metal mask may be previously provided in the transparent substrate 2.

In the manufacturing method according to this embodiment, the width $\gamma$ of the metalized film 5 at the corners shown in FIG. 2 is preferably equal to or larger than the width $\alpha$ of the metalized film 5 at the sides along the direction Y, more preferably larger than the width $\alpha$ of the metalized film 5 at the sides along the direction Y, still more preferably 1.001 times to 5.0 times the width $\alpha$ of the metalized film 5 at the sides along the direction Y, particularly preferably 1.01 times to 3.0 times the width $\alpha$, and most preferably 1.2 times to 2.7 times the width $\alpha$. Furthermore, the width $\gamma$ of the metalized film 5 at the corners shown in FIG. 2 is preferably equal to or larger than the width $\beta$ of the metalized film 5 at the sides along the direction X, more preferably larger than the width $\beta$ of the metalized film 5 at the sides along the direction X, still more preferably 1.001 times to 5.0 times the width $\beta$ of the metalized film 5 at the sides along the direction X, particularly preferably 1.01 times to 3.0 times the width $\beta$, and most preferably 1.2 times to 2.7 times the width $\beta$.

Thus, when the transparent member 1 is used as a window component for an optical element, the airtightness of the window component can be easily increased. As a result, the reliability of the window component for an optical element can be further increased.

The width $\gamma$ of the metalized film 5 at the corners may be, for example, 0.1 mm to 5.0 mm or 0.2 mm to 3.0 mm. Thus, when the transparent member 1 is used as a window component for an optical element, the airtightness of the window component can be easily increased with higher certainty. As a result, the reliability of the window component for an optical element can be increased with higher certainty.

The width $\alpha$ of the metalized film 5 at the sides along the direction Y is not particularly limited, but may be, for example, $\alpha$=0.1 mm to 1.0 mm or 0.1 mm to 0.5 mm. The width $\beta$ of the metalized film 5 at the sides along the direction X may also be, for example, $\beta$=0.1 mm to 1.0 mm or 0.1 mm to 0.5 mm. Thus, when the transparent member 1 is used as a window component for an optical element, the airtightness of the window component can be easily increased with higher certainty. As a result, the reliability of the window component for an optical element can be increased with higher certainty. Furthermore, when the width $\alpha$ of the metalized film 5 along the direction Y is equal to the width $\beta$ thereof along the direction X, the stress in bonding the transparent member 1 to a window component for an optical element by solder can be easily dispersed. Naturally, depending on the design of the window component for an optical element, the width of the metalized film 5 may be $\alpha \neq \beta$.

In the present invention, only one of the antireflection film 4 and the metalized film 5 may be deposited or another or other films may be deposited. Furthermore, the metalized film 5 may be formed directly on the transparent substrate 2. Alternatively, no film may be deposited on the transparent substrate 2. The antireflection film 4 may be provided on each of the principal surfaces located on both sides of the transparent substrate 2.

(Second Step)

In the second step, the transparent substrate 2 is separated along imaginary lines X1 and imaginary lines Y1 shown in FIGS. 1 and 2. Thus, the transparent substrate 2 is separated into pieces, thus obtaining transparent members. The imaginary line X1 is a straight line connecting the centers of through holes 3 in the direction X. The imaginary line Y1 is a straight line connecting the centers of through holes 3 in the direction Y.

The method for separating the transparent substrate 2 is not particularly limited, but may be, for example, implemented by dicing. For example, the transparent substrate 2 is separated by running a dicing blade through it along the imaginary lines X1. Next, the transparent substrate 2 is further separated by running the dicing blade through it along the imaginary lines Y1, thus obtaining transparent members.

In the manufacturing method according to this embodiment, as shown in FIG. 5, transparent members 1 having an approximately rectangular shape chamfered at the corners 11*a* to 11*d* can be obtained. In accordance with the manufacturing method according to this embodiment, even in manufacturing transparent members having the above shape, the number of transparent members obtained from the transparent substrate 2 as a base material can be increased. This can be explained as follows.

Conventionally, in forming, by dicing, transparent members having an approximately rectangular shape chamfered at the corners, it is necessary to separate a transparent substrate 100 along the broken lines as shown in FIG. 13. However, in this case, portions of the transparent substrate 100 other than transparent members obtained by cutting out the transparent substrate 100 into desired shapes cannot be used anymore for this purpose and, therefore, there arises a problem of difficulty in increasing the number of transparent members 1 obtained from the transparent substrate 100.

Unlike the above, in the manufacturing method according to this embodiment, the transparent substrate 2 is separated along the imaginary lines X1 and the imaginary lines Y1 shown in FIGS. 1 and 2. Therefore, portions of the transparent substrate 2 unable to be used anymore for this purpose can be minimized and the number of transparent members obtained from the transparent substrate 2 can be increased.

In the transparent members 1 obtained by the manufacturing method according to this embodiment, the corners 11*a* to 11*d* have a chamfered shape. Therefore, for example, in using the transparent member 1 as a window component for an optical element to be described hereinafter and bonding it to an enclosure 22 like a package shown in FIG. 7, the corners 11*a* to 11*d* of the transparent member 1 are less likely to interfere with the frame of the enclosure 22. In addition, when, conventionally, a substrate is cut by a dicing blade, unnecessary projections (burrs) are often produced on the cut surface. In contrast, in the transparent member 1 according to this embodiment, unlike the transparent member obtained by cutting with a dicing blade, burrs as described above are not formed on the corners 11*a* to 11*d* and, as a result, the corners 11*a* to 11*d* of the transparent member 1 are less likely to interfere with the frame of the enclosure 22. Therefore, the transparent member 1 obtained by the manufacturing method according to this embodiment can be suitably used as a window component for an optical element.

Furthermore, in the manufacturing method according to this embodiment, the through holes 3 can be formed by etching the transparent substrate 2 at the to-be-passed-through points. Therefore, when the transparent substrate 2 is separated along the imaginary lines X1 and imaginary lines Y1 connecting the centers of the through holes 3, portions of the lateral surfaces 10*c* of the obtained transparent members 1 located at the corners 11*a* to 11*d* are etched surfaces.

Meanwhile, as shown in FIGS. 5 and 7, in using the transparent member 1 according to this embodiment as a window component for an optical element, the transparent member 1 and the enclosure 22 are soldered at the metalized film 5. In this case, the amount of solder provided around the corners 11*a* to 11*d* is likely to be large and, therefore, the stress due to solder bonding is likely to become concentrated at the corners 11*a* to 11*d*. At this time, since the portions of the lateral surface 10*c* of the transparent member 1 according to this embodiment located at the corners 11*a* to 11*d* is etched surfaces, the transparent member 1 is less likely to undergo chipping that might be caused by dicing. Therefore, the transparent member 1 according to this embodiment has a large strength at the corners 11*a* to 11*d* and is less likely to be broken even when the stress due to solder bonding is concentrated at the corners 11*a* to 11*d*. Also for this reason, the transparent member 1 obtained by the manufacturing method according to this embodiment can be suitably used as a window component for an optical element.

Particularly, when the width $\gamma$ of the metalized film 2 at the corners is equal to or larger than the width $\alpha$ thereof at the sides along the direction Y, the amount of solder provided around the corners 11*a* to 11*d* is likely to be large and, therefore, the stress due to solder bonding is likely to become concentrated particularly at the corners 11*a* to 11*d*. However, since the portions of the lateral surface 10*c* of the transparent member 1 according to this embodiment located at the corners 11*a* to 11*d* are etched surfaces, the transparent member 1 is less likely to undergo chipping that might be caused by dicing. Therefore, the transparent member 1 according to this embodiment has a large strength at the corners 11*a* to 11*d* and is less likely to be broken even when the stress due to solder bonding is concentrated at the corners 11*a* to 11*d*.

In the present invention, after the through holes 3 are formed in the first step, etching may be performed along the imaginary lines X1 and imaginary lines Y1 connecting the through holes 3 to form grooves 7 shown in FIG. 3. In the etching, the portions other than portions where the grooves 7 are to be formed are preferably covered with meal mask. In transparent members 1 obtained by separating the transparent substrate 2 along the grooves 7, portions of their lateral surfaces 10*c* located at the sides 12*a* to 12*d* can have a light-chamfered shape. In this case, in using the transparent member 1 as a window component for an optical element and bonding it by solder, the transparent member 1 can be even less likely to be broken.

Although in the above embodiment the through holes 3 having an approximately diamond planar shape are formed, the shape of the through holes 3 is not particularly limited. The planar shape of the through holes 3 may be an approximately square as shown in FIG. 4 (*a*) or may be an approximately circular as shown in FIG. 4(*b*). Alternatively, as shown in FIG. 4(*c*), an approximately circular through hole 3A for positioning may be formed between approximately diamond-shaped through holes 3. The through holes 3A for positioning become semicircular after the separating and can be used, for example, for positioning in using the transparent member 1 as a window member for an optical element and bonding it to the enclosure 22. The plurality of through holes 3 may not necessarily have the same shape and may be a combination of through holes 3 having different planar shapes.

[Transparent Member]

FIG. 5 is a schematic plan view showing a transparent member according to one embodiment of the present invention. FIG. 6 is a schematic cross-sectional view of a portion taken along the line A-A in FIG. 5.

As shown in FIGS. 5 and 6, a substrate body 10 of the transparent member 1 has a first principal surface 10*a* and a second principal surface 10*b* opposed to each other. The substrate body 10 of the transparent member 1 further has a lateral surface 10*c* connecting the first principal surface 10*a* and the second principal surface 10*b*.

Examples of the material for the substrate body 10 of the transparent member 1 that can be used include glasses, such as quartz glass, and sapphire. The shape of the transparent member 1 is an approximately rectangular plate-like shape in this embodiment, but is not particularly limited. The area of the transparent member 1 may be, for example, not less than 1 $mm^2$ and not more than 400 $mm^2$. The thickness of the substrate body 10 of the transparent member 1 may be, for example, not less than 0.05 mm and not more than 2.00 mm.

As shown in FIG. 5, the transparent member 1 has four corners 11*a* to 11*d* and four sides 12*a* to 12*d*. In the transparent member 1, the four corners 11*a* to 11*d* have a chamfered shape. For the four corners 11*a* to 11*d*, for example, the equation c (the dimension of the cut-away side portion)=0.05 mm to 0.20 mm can be given.

In the transparent member 1, the four sides 12*a* to 12*d* may have a light-chamfered shape. In this case, in using the transparent member 1 as a window component for an optical element and bonding it to the enclosure 22 by solder as described previously, the transparent member 1 can be even less likely to be broken. The light-chamfered shape may be, for example, such a shape that c (the dimension of the cut-away side portion) is not less than 0.01 mm and not more than 0.20 mm, and is more preferably such a shape that c (the dimension of the cut-away side portion) is not less than 0.03 mm and not more than 0.06 mm.

In the transparent member 1, the portions of the lateral surface 10*c* located at the four corners 11*a* to 11*d* are etched surfaces. The portions of the lateral surface 10*c* located at the four sides 12*a* to 12*d* are diced surfaces. This transparent member 1 can be produced, for example, by the above-described method for manufacturing a transparent member according to the present invention.

In the present invention, a portion of the lateral surface 10*c* located at least one of the four corners 11*a* to 11*d* is sufficient to be provided with an etched surface. Furthermore, a portion of the lateral surface 10*c* of located at least one of the four sides 12*a* to 12*d* is sufficient to be provided with a diced surface.

When, as in the transparent member 1 according to this embodiment, the portions of the lateral surface 10*c* located at the corners 11*a* to 11*d* are etched surfaces, chipping that might be caused by dicing is less likely to occur. Therefore, the transparent member 1 has a large strength at the corners 11*a* to 11*d* and is less likely to be broken even when the stress due to solder bonding is concentrated at the corners 11*a* to 11*d*. Therefore, the transparent member 1 according to this embodiment can be suitably used as a window component for an optical element.

In the transparent member 1 according to this embodiment, as described previously, a metalized film 5 may be provided on the substrate body 10. The width γ of the metalized film 5 at the corners is preferably equal to or larger than the width α of the metalized film 5 at the sides along the direction Y, more preferably larger than the width α of the metalized film 5 at the sides along the direction Y, still more preferably 1.001 times to 5.0 times the width α of the metalized film 5 at the sides along the direction Y, particularly preferably 1.01 times to 3.0 times the width α, and most preferably 1.2 times to 2.7 times the width α. Furthermore, the width γ of the metalized film 5 at the corners shown in FIG. 5 is preferably equal to or larger than the width β of the metalized film 5 at the sides along the direction X, more preferably larger than the width β of the metalized film 5 at the sides along the direction X, still more preferably 1.001 times to 5.0 times the width β of the metalized film 5 at the sides along the direction X, particularly preferably 1.01 times to 3.0 times the width β, and most preferably 1.2 times to 2.7 times the width β.

Thus, when the transparent member 1 is used as a window component for an optical element, the airtightness of the window component can be easily increased. As a result, the reliability of the window component for an optical element can be further increased.

When the metalized film 5 has the above-described features in terms of width, the amount of solder provided around the corners 11*a* to 11*d* is likely to be large and, therefore, the stress due to solder bonding is likely to become concentrated at the corners 11*a* to 11*d*. However, since the portions of the lateral surface 10*c* of the transparent member 1 according to this embodiment located at the corners 11*a* to 11*d* are etched surfaces, the transparent member 1 is less likely to undergo chipping that might be caused by dicing. Therefore, the transparent member 1 according to this embodiment has a large strength at the corners 11*a* to 11*d* and is less likely to be broken even when the stress due to solder bonding is concentrated at the corners 11*a* to 11*d*.

The width γ of the metalized film 5 at the corners may be, for example, 0.1 mm to 5.0 mm or 0.2 mm to 3.0 mm. Thus, when the transparent member 1 is used as a window component for an optical element, the airtightness of the window component can be easily increased with higher certainty. As a result, the reliability of the window component for an optical element can be increased with higher certainty.

The width α of the metalized film 5 at the sides along the direction Y is not particularly limited, but may be, for example, 0.1 mm to 1.0 mm or 0.1 mm to 0.5 mm. The width β of the metalized film 5 at the sides along the direction X may be, for example, likewise, 0.1 mm to 1.0 mm or 0.1 mm to 0.5 mm. Thus, when the transparent member 1 is used as a window component for an optical element, the airtightness of the window component can be easily increased with higher certainty. As a result, the reliability of the window component for an optical element can be increased with higher certainty. Furthermore, when the width α of the metalized film 5 along the direction Y is equal to the width β thereof along the direction X, the stress in bonding the transparent member 1 to a window component for an optical element by solder can be easily dispersed. Naturally, depending on the design of the window component for an optical element, the width the metalized film 5 may be α≠β.

In this embodiment, the maximum profile valley depth Rv of the lateral surface 10*c* (etched surface) located at the corners 11*a* to 11*d* is preferably smaller than the maximum profile valley depth Rv of the lateral surface 10*c* (diced surface) located at the sides 12*a* to 12*d*. In this case, the strength at the corners 11*a* to 11*d* can be further increased and breakage can be even less likely to occur even when the stress due to solder bonding is concentrated at the corners 11*a* to 11*d*.

The maximum profile valley depth Rv of the lateral surface 10*c* (etched surface) located at the corners 11*a* to 11*d* is preferably not less than 0.100 μm, more preferably not less than 0.300 μm, preferably not more than 1.100 μm, more preferably not more than 1.000 μm, and even more preferably not more than 0.800 μm. When the maximum profile valley depth Rv of the lateral surface 10*c* (etched surface) located at the corners 11*a* to 11*d* is in the above range, the strength at the corners 11*a* to 11*d* can be further increased and breakage can be even less likely to occur even when the stress due to solder bonding is concentrated at the corners 11*a* to 11*d*. The maximum profile valley depth Rv can be measured in conformity with JIS B 0601:2013.

Furthermore, the total height of the profile Rt, load length ratio Rmr, and kurtosis Rku of the lateral surface 10*c* (etched surface) located at the corners 11*a* to 11*d* are preferably smaller than the total height of the profile Rt, load length ratio Rmr, and kurtosis Rku, respectively, of the lateral surface 10*c* (diced surface) located at the sides 12*a* to 12*d*.

On the other hand, the maximum profile peak height Rp, mean height of the profile elements Rc, skewness Rsk, and mean width of the profile elements RSm of the roughness curve for the lateral surface 10*c* (etched surface) located at the corners 11*a* to 11*d* are preferably larger than the maximum profile peak height Rp, mean height of the profile elements Rc, skewness Rsk, and mean width of the profile elements RSm of the roughness curve, respectively, for the lateral surface 10*c* (diced surface) located at the sides 12*a* to 12*d*.

The maximum profile peak height Rp of the lateral surface 10*c* (etched surface) located at the corners 11*a* to 11*d* may be, for example, not less than 0.500 μm and not more than 3.000 μm. The total height of the profile Rt of the lateral surface 10*c* (etched surface) located at the corners 11*a* to 11*d* may be, for example, not less than 0.500 μm and not more than 2.500 μm. The load length ratio Rmr of the lateral surface 10*c* (etched surface) located at the corners 11*a* to 11*d* may be, for example, not less than 10% and not more than 50%. The mean height of the profile elements Rc of the lateral surface 10*c* (etched surface) located at the corners 11*a* to 11*d* may be, for example, not less than 0.500 μm and not more than 3.000 μm. The mean width of the profile elements RSm of the roughness curve for the lateral surface 10*c* (etched surface) located at the corners 11*a* to 11*d* may be, for example, not less than 8 μm and not more than 30 μm. The kurtosis Rku of the lateral surface 10*c* (etched surface) located at the corners 11*a* to 11*d* may be, for example, not less than 1 μm and not more than 10 μm. All of these parameters can be measured in conformity with JIS B 0601:2013.

In this embodiment, as shown in FIG. 6, an antireflection film 4 and a metalized film 5 are provided in this order on the substrate body 10. The antireflection film 4 may be provided on each of the first principal surface 10*a* and the second principal surface 10*b*.

An example of the antireflection film 4 that can be used is a layered film in which low-refractive index films, medium-refractive index films, and high-refractive index films are alternately layered.

Examples of the material for the low-refractive index films that can be used include SiO, $SiO_2$, and $MgF_2$.

An example of the material for the medium-refractive index films that can be used is $Al_2O_3$.

Examples of the material for the high-refractive index films that can be used include $Ta_2O_5$, TiO, $TiO_2$, $Nb_2O_5$, $HfO_2$, $ZrO_2$, and Si.

The thickness of the low-refractive index films may be, for example, not less than 10 nm and not more than 5000 nm. The thickness of the medium-refractive index films may be, for example, not less than 10 nm and not more than 5000 nm. The thickness of the high-refractive index films may be, for example, not less than 10 nm and not more than 5000 nm.

The antireflection film 4 may be a film in which low-refractive index films and high-refractive index films are alternately layered, a film in which low-refractive index films and medium-refractive index films are alternately layered, or a film in which medium-refractive index films and high-refractive index films are alternately layered. Alternatively, the antireflection film 4 may be formed only of a low refractive index film. The entire thickness of the antireflection film 4 may be, for example, not less than 20 nm and not more than 10000 nm.

The type of the metalized film 5 is not particularly limited, but a layered film where a first layer, a second layer, and a third layer are layered in this order may be used.

The first layer is, for example, a layer made of Cr, Ti, Ta or TiW. Among them, a layer made of Cr is preferred as the first layer. The second layer is, for example, a layer made of Ni, Pt, Pd, TiW or Ni-containing alloy, such as Ni—Cr. Among them, a layer made of Ni is preferred as the second layer. An example of the third layer is a layer made of Au.

The thickness of the first layer may be, for example, not less than 0.01 μm and not more than 0.50 μm. The thickness of the second layer may be, for example, not less than 0.10 μm and not more than 8.00 μm. The thickness of the third layer may be, for example, not less than 0.01 μm and not more than 3.00 μm.

The metalized film 5 is sufficient to include at least one of the first layer, the second layer, and the third layer. The entire thickness of the metalized film 5 may be, for example, not less than 0.12 μm and not more than 11.5 μm.

In the case of bonding using gold-tin solder, tin-silver-copper solder or the like, both the antireflection film 4 and the metalized film 5 are preferably provided. On the other hand, in the case of sealing with low-melting-point glass or sealing with an adhesive when airtight sealing is unnecessary, the antireflection film 4 only may be provided without the metalized film 5.

[Window Component for Optical Element]

FIG. 7 is a schematic cross-sectional illustration showing an example where the transparent member according to the one embodiment of the present invention is used as a window component for an optical element. FIG. 7 shows an optical element in a schematic form in which two diagonal lines are added to a rectangle.

FIG. 7 shows an example of an optical module 20 in which an optical element 21 is contained in an enclosure 22. The enclosure 22 includes a light transmitting hole 23 through which light for optical communication or so on passes. The transparent member 1 according to this embodiment is a window component for an optical element that covers the light transmitting hole 23. The transparent member 1 transmits light for optical communication or so on. The transparent member 1 is soldered at the metalized film 5 to the enclosure 22.

The window component for an optical element (the transparent member 1) according to this embodiment has a shape chamfered at the corners 11*a* to 11*d*. Therefore, in bonding the transparent member 1 to the enclosure 22 like a package, the corners 11*a* to 11*d* of the transparent member 1 are less likely to interfere with the frame of the enclosure 22.

Furthermore, the window component for an optical element (the transparent member 1) according to this embodiment has a large strength at the corners 11*a* to 11*d* and is less likely to be broken even when the stress due to solder bonding is concentrated at the corners 11*a* to 11*d*.

Hereinafter, a description will be given of an experimental example. However, the present invention is not at all limited by the following experimental example.

(Experimental Example)

In an experimental example, through holes 3 shown in FIGS. 1 and 2 were created. Specifically, approximately diamond-shaped through holes 3 were formed by irradiating to-be-passed-through points on a transparent substrate 2 with laser light to provide modified portions in the inside of the transparent substrate 2 and then etching the to-be-passed-through points having the modified portions. The etching was performed by bringing an etchant into contact with the to-be-passed-through points.

Next, the transparent substrate 2 was separated along the imaginary lines X1 and the imaginary lines Y1 shown in FIGS. 1 and 2, thus obtaining transparent members 1 shown in FIGS. 5 and 6. As shown in FIG. 5, the obtained transparent members 1 had a shape chamfered at the corners 11*a* to 11*d*.

FIG. 8 is a laser micrograph of a transparent member obtained in an experimental example. The laser micrograph was obtained by measurement at 20-fold magnification using a laser microscope (item number "OLS4000" manufactured by Olympus Corporation). As shown in FIG. 8, chipping was observed at a lateral surface (diced surface)

located at a side of the obtained transparent member 1. On the other hand, no chipping was observed at the lateral surface (etched surface) located at the corners of the obtained transparent member 1.

FIG. 9 is a laser micrograph of a lateral surface (diced surface) located at a side of the transparent member obtained in the experimental example. FIG. 10 is a laser micrograph of the lateral surface (etched surface) located at a corner of the transparent member obtained in the experimental example. The laser micrographs were obtained by measurement at 100-fold magnification using a laser microscope (item number "OLS4000" manufactured by Olympus Corporation).

FIG. 11(*a*) is a roughness curve of the lateral surface (diced surface) located at the side of the transparent member obtained in the experimental example as generated in a direction along the side (direction X) and FIG. 11(*b*) is a roughness curve thereof as generated in a direction of thickness (direction Z). FIG. 12 (*a*) is a roughness curve of the lateral surface (etched surface) located at the corner of the transparent member obtained in the experimental example as generated in the direction along the side (direction X) and FIG. 12 (*b*) is a roughness curve thereof as generated in the direction of thickness (direction Z). The roughness curves were obtained by measurement in conformity with JIS B 0601:2013 using a laser microscope (item number "OLS4000" manufactured by Olympus Corporation).

As shown in FIGS. 11 (*a*) and 11 (*b*), at the lateral surface (diced surface) located at the side of the transparent member, linear waveforms were observed as roughness curves in both the direction along the side (direction X) and the direction of thickness (direction Z) and disturbances in waveform due to chipping (localized deep valleys) were also observed in the roughness curves. On the other hand, as shown in FIGS. 12(*a*) and 12(*b*), at the lateral surface (etched surface) located at the corner of the transparent member, no disturbance in waveform due to chipping was observed in roughness curves in both the direction along the side (direction X) and the direction of thickness (direction Z), but a waveform convex toward the center of the etched surface was observed, particularly, as the roughness curve in the direction of thickness.

Next, for the lateral surface (etched surface) located at the corner of the obtained transparent member, the roughness curves in the direction along the side (direction X) and the direction of thickness (direction Z) were measured in terms of some parameters. Likewise, for the lateral surface (diced surface) located at the side of the obtained transparent member, the roughness curves in the direction along the side (direction X) and the direction of thickness (direction Z) were measured in terms of some parameters. The measured parameters were the maximum profile valley depth Rv, the total height of the profile Rt, the load length ratio Rmr, the maximum profile peak height Rp, the mean height of the profile elements Rc, the skewness Rsk, the mean width of the profile elements RSm of the roughness curve, and the kurtosis Rku. The measurement was conducted in conformity with JIS B 0601:2013 using a laser microscope (item number "OLS4000" manufactured by Olympus Corporation).

The results are shown in Table 1 below.

TABLE 1

| | Corner (Etched Surface) Direction along Side (Direction X) | Side (Diced Surface) Direction along Side (Direction X) | Corner (Etched Surface) Thickness Direction (Direction Z) | Side (Diced Surface) Thickness Direction (Direction Z) |
|---|---|---|---|---|
| Rp (μm) | 0.7100 | 0.3760 | 0.7670 | 0.4452 |
| Rt (μm) | 1.2070 | 1.7630 | 1.8370 | 2.5160 |
| Rmr (%) | 17.337 | 92.437 | 25.367 | 96.836 |
| Rv (μm) | 0.4970 | 1.3870 | 0.7925 | 1.1007 |
| Rc (μm) | 0.7240 | 0.5459 | 1.0042 | 0.7750 |
| Rsk | 0.767 | −2.326 | −0.041 | −1.619 |
| Rsm (μm) | 12.1895 | 9.283 | 14.6 | 8.2641 |
| Rku | 4.350 | 11.870 | 2.835 | 6.705 |

As shown in Table 1, for example, it was confirmed that the maximum profile valley depth Rv at the lateral surface (etched surface) located at the corner of the obtained transparent member was smaller than that at the lateral surface (diced surface) located at the side thereof.

REFERENCE SIGNS LIST

1 . . . transparent member
2 . . . transparent substrate
3, 3A, 6 . . . through hole
4 . . . antireflection film
5 . . . metalized film
7 . . . groove
10 . . . substrate body
10*a*, 10*b* . . . first, second principal surface
10*c* . . . lateral surface
11*a* to 11*d* . . . corner
12*a* to 12*d* . . . side
20 . . . optical module
21 . . . optical element
22 . . . enclosure
23 . . . light transmitting hole
100 . . . transparent substrate

The invention claimed is:

1. A transparent member having: a first principal surface and a second principal surface opposed to each other and a lateral surface connecting the first principal surface and the second principal surface; and having a plurality of corners and a plurality of sides in plan view, wherein a portion of the lateral surface located at at least one of the plurality of corners is an etched surface, a portion of the lateral surface located at at least one of the plurality of sides is a diced surface, and a maximum profile valley depth Rv of the etched surface measured in conformity with JIS B 0601:2013 is smaller than a maximum profile valley depth Rv of the diced surface measured in conformity with JIS B 0601:2013.

2. The transparent member according to claim 1, wherein at least one of the plurality of corners has a chamfered shape.

3. The transparent member according to claim 1, wherein at least one of the plurality of sides has a light-chamfered shape.

4. A window component for an optical element, the window component comprising the transparent member according to claim 1.

5. A transparent member having: a first principal surface and a second principal surface opposed to each other and a lateral surface connecting the first principal surface and the second principal surface; and having a plurality of corners and a plurality of sides in plan view, wherein a portion of the lateral surface located at at least one of the plurality of corners is an etched surface, a portion of the lateral surface located at at least one of the plurality of sides is a diced surface, and a maximum profile valley depth Rv of the etched surface measured in conformity with JIS B 0601:2013 is not less than 0.100 μm and not more than 1.100 μm.

6. A transparent member having: a first principal surface and a second principal surface opposed to each other and a lateral surface connecting the first principal surface and the second principal surface; and having a plurality of corners and a plurality of sides in plan view, wherein a portion of the lateral surface located at at least one of the plurality of corners is an etched surface, a portion of the lateral surface located at at least one of the plurality of sides is a diced surface, a metalized film is provided on at least one of the first principal surface and the second principal surface, and the metalized film has a width $\gamma$ of the corners equal to or larger than a width $\alpha$ of the sides.

7. A transparent member having: a first principal surface and a second principal surface opposed to each other and a lateral surface connecting the first principal surface and the second principal surface; and having a plurality of corners and a plurality of sides in plan view, wherein a portion of the lateral surface located at at least one of the plurality of corners is an etched surface, a portion of the lateral surface located at at least one of the plurality of sides is a diced surface, and an antireflection film is provided on at least one of the first principal surface and the second principal surface.

* * * * *